(12) United States Patent
Kreitzer

(10) Patent No.: US 10,594,906 B1
(45) Date of Patent: Mar. 17, 2020

(54) COLLAPSIBLE SPACES

(71) Applicant: Smart Space Visible Solutions, LLC, Cedar City, UT (US)

(72) Inventor: Angela Smith Kreitzer, Cedar City, UT (US)

(73) Assignee: Smart Space Visible Solutions, LLC, Cedar City, UT (US)

( * ) Notice: Subject to any disclaimer, the term of this patent is extended or adjusted under 35 U.S.C. 154(b) by 0 days.

(21) Appl. No.: 16/156,921

(22) Filed: Oct. 10, 2018

(51) Int. Cl.
*E04H 15/58* (2006.01)
*H04N 5/222* (2006.01)
*H04N 7/15* (2006.01)
*H04N 7/14* (2006.01)

(52) U.S. Cl.
CPC ............. *H04N 5/222* (2013.01); *E04H 15/58* (2013.01); *H04N 7/142* (2013.01); *H04N 7/15* (2013.01)

(58) Field of Classification Search
CPC ............................... E04H 15/001; E04H 15/58
USPC ........................................................ 135/126
See application file for complete search history.

(56) References Cited

U.S. PATENT DOCUMENTS

| 6,267,129 | B1 * | 7/2001 | Zheng | E04H 15/40 135/126 |
| 6,305,396 | B1 * | 10/2001 | Zheng | A63B 9/00 135/115 |
| 6,449,147 | B2 * | 9/2002 | Zheng | A63B 9/00 135/143 |
| 6,705,338 | B2 * | 3/2004 | Zheng | E04H 15/40 135/117 |
| 6,782,905 | B2 * | 8/2004 | Chu | E04H 15/40 135/126 |
| 7,884,846 | B2 * | 2/2011 | Ferren | H04L 12/1827 348/14.08 |
| 8,366,177 | B2 * | 2/2013 | Prusmack | B60P 3/34 135/135 |
| 2004/0159347 | A1 * | 8/2004 | Brown | E04H 15/40 135/125 |
| 2005/0081903 | A1 * | 4/2005 | Wang | E04H 15/40 135/126 |
| 2006/0169310 | A1 * | 8/2006 | Qian | A47K 11/04 135/128 |
| 2010/0319742 | A1 * | 12/2010 | Prusmack | B60P 3/34 135/88.13 |

(Continued)

*Primary Examiner* — Noah Chandler Hawk
(74) *Attorney, Agent, or Firm* — Terrence J. Edwards; TechLaw Ventures, PLLC

(57) ABSTRACT

Portable and collapsible enclosures for use in participating in online meetings, such as educational or business meetings are disclosed. In one illustrative embodiment, the enclosure, when erected, may generally be formed as a rectangular cube with four sides, a top and a bottom. Three sides may be completely covered by textile panels, with the fourth side having a large opening. The top side may be closed by a textile material connected to the top sides of the four side panels and extending therebetween. The enclosure may be sized to allow a participant to sit or stand therein, and the interior with the participant viewed using a camera for online meetings. The textile panels may be colored to allow a contrast for better visualization of the participant. In other embodiments, it may be constructed to allow for virtual projection of desired background images around the participant. Methods and processes for using the enclosures are also disclosed.

16 Claims, 4 Drawing Sheets

(56) References Cited

U.S. PATENT DOCUMENTS

| | | | |
|---|---|---|---|
| 2013/0306121 A1* | 11/2013 | Hung Lau | A01M 31/025 135/117 |
| 2014/0330579 A1* | 11/2014 | Cashman | E04H 1/1222 705/2 |
| 2018/0155955 A1* | 6/2018 | Ferrara | E04H 15/56 |

* cited by examiner

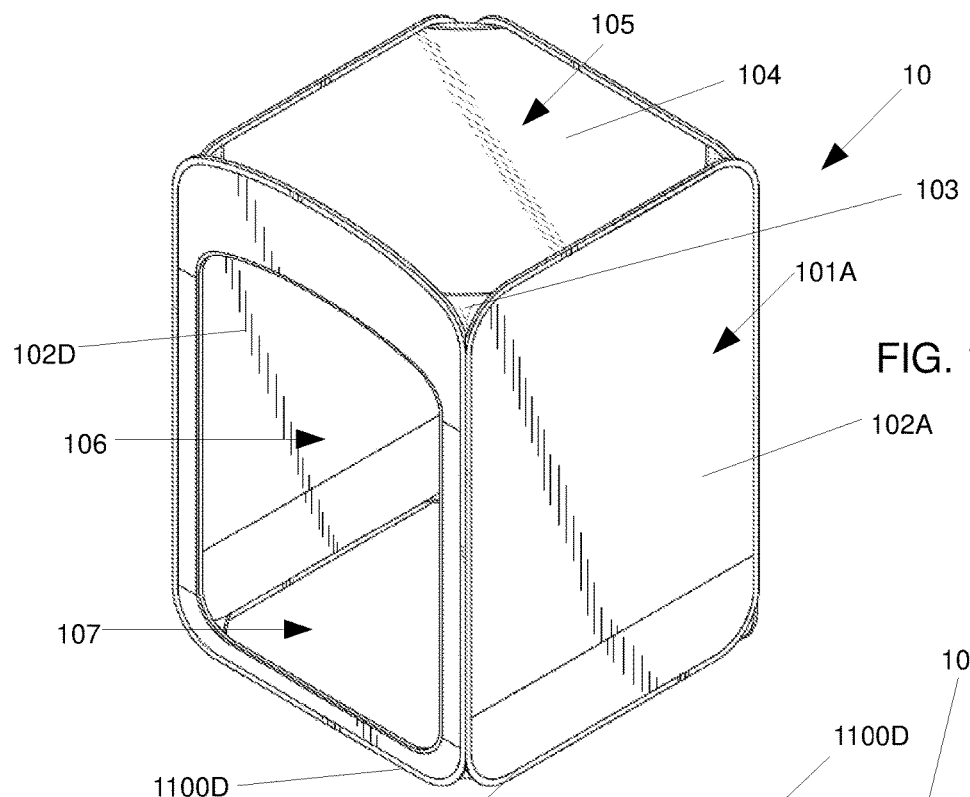
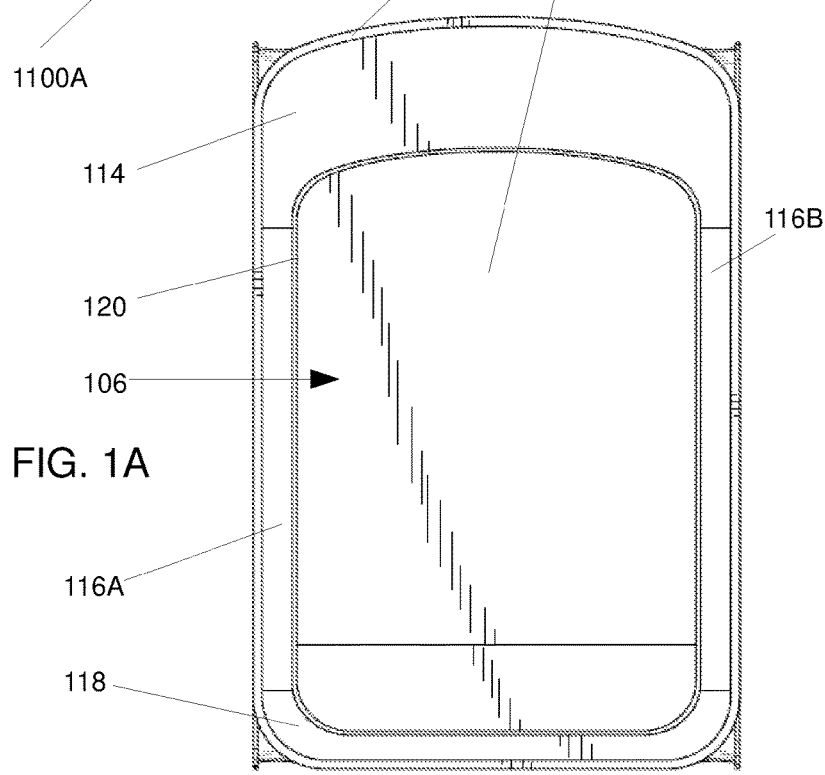

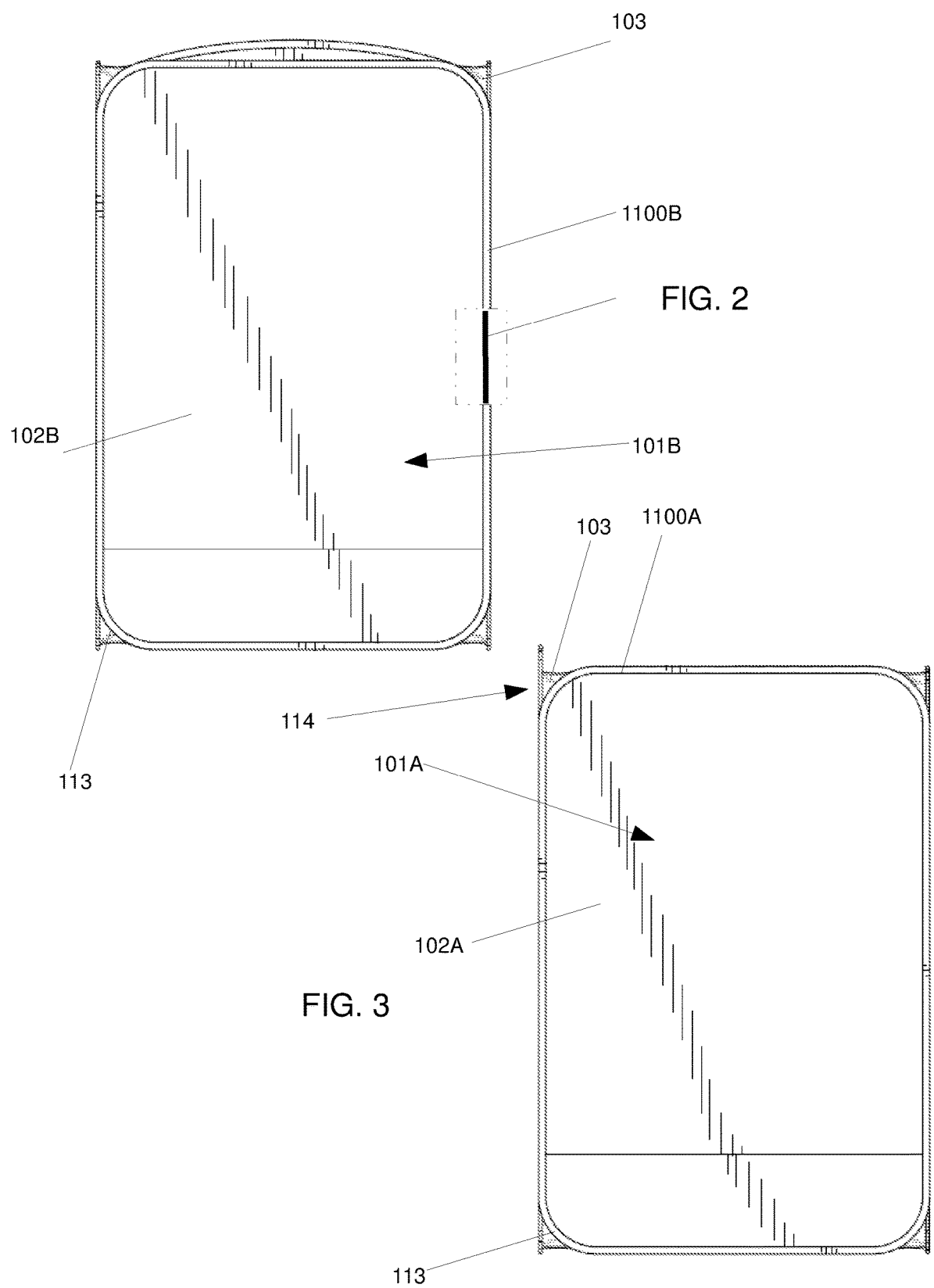

COLLAPSIBLE SPACES

BACKGROUND

As online and remote educational, business, and other experiences become more prevalent, students, teachers, business people, and others are streaming video and communicating online using virtual classrooms, virtual offices, and other virtual spaces. In theory, this can allow education, business meetings, or any other meetings, to be conducted from many locations, such as in a teacher's or student's home, a business person's home or other location. However, where specific classes or meetings require students or others to work together in teams, groups or to otherwise participate in activities at the same time, the use of two-way online video and audio transmission can introduce multiple distractions, due to, inter alia, the background environment for the different participants being introduced to the shared online experience.

Further, this can raise privacy concerns for participants. In order to preserve privacy, for example student and teacher privacy, many remote programs often require participant's, such as students and teachers, to travel to specific locations, such as a classroom or office at a satellite location, to conduct the teaching or attend a class or meeting. This required travel removes some advantages of online and distance education and other meetings.

Similarly, while isolated study areas, such as carrels, have long been used in educational settings, or offices housing desks and office furniture in the case of business people, carrels, desks and office furniture are typically large and permanent installations that are inappropriate for use in a home, due to the dedicated space required and the expense of the furniture.

A system or method that allowed for privacy and uniformity while participating in online or distance meetings from a home setting would be an improvement in the art. Such a system or method that is relatively inexpensive, flexible for use with different technologies and does not require dedicated space in a user's home would be a further improvement in the art.

SUMMARY

The present disclosure extends to apparatuses, methods, and systems for providing private temporary spaces or enclosures for online and distance meetings. It will be appreciated that the disclosure is applicable to any situation where a temporary space is needed, whether for use at home or any other location to provide privacy and prevent distractions for other online participants. For example, the present disclosure may be utilized in educational settings, business settings, personal settings, or any other setting where privacy and removing distractions from online participants in a meeting is advantageous. For the sake of simplicity, the disclosure will focus on educational settings, such as online courses or education, which is done by way of example only.

In one illustrative embodiment, a unique 3-sided enclosure may provide a learning space in a home environment for participating in online or distance education. The enclosure may provide a protective barrier so the view of a participant that is available to other participants is limited to the participant and excludes the surrounding environment.

In one illustrative embodiment, a portable and collapsible enclosure for use in participating in online education is provided. The enclosure, when erected, may generally be formed as a rectangular or cubic structure with four sides, a top and a bottom. Three sides may be completely covered by textile panels, with the fourth side having a large opening. The top side may be closed by a textile material connected to the top sides of the four side panels and extending therebetween.

In some illustrative embodiments, the enclosure may be sized to allow a student or teacher to sit or stand therein, and the interior viewed by other participants using a camera for online education. In some embodiment, the textile panels may be colored to allow a contrast for better visualization of the student. In other embodiments, it may be constructed to allow for the virtual projection of desired background images around the student. Methods and processes for education and using the enclosures are also included.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIGS. 1 and 1A illustrates perspective and front views, respectively, of a collapsible structure for a remote space in accordance with the technologies and features of the disclosure in an erected conformation for use;

FIGS. 2, 3, 4, 5, and 6 illustrates rear side, right side, left side, top and bottom view respectively of the structure of FIGS. 1 and 1A.

DETAILED DESCRIPTION

Figure 4:
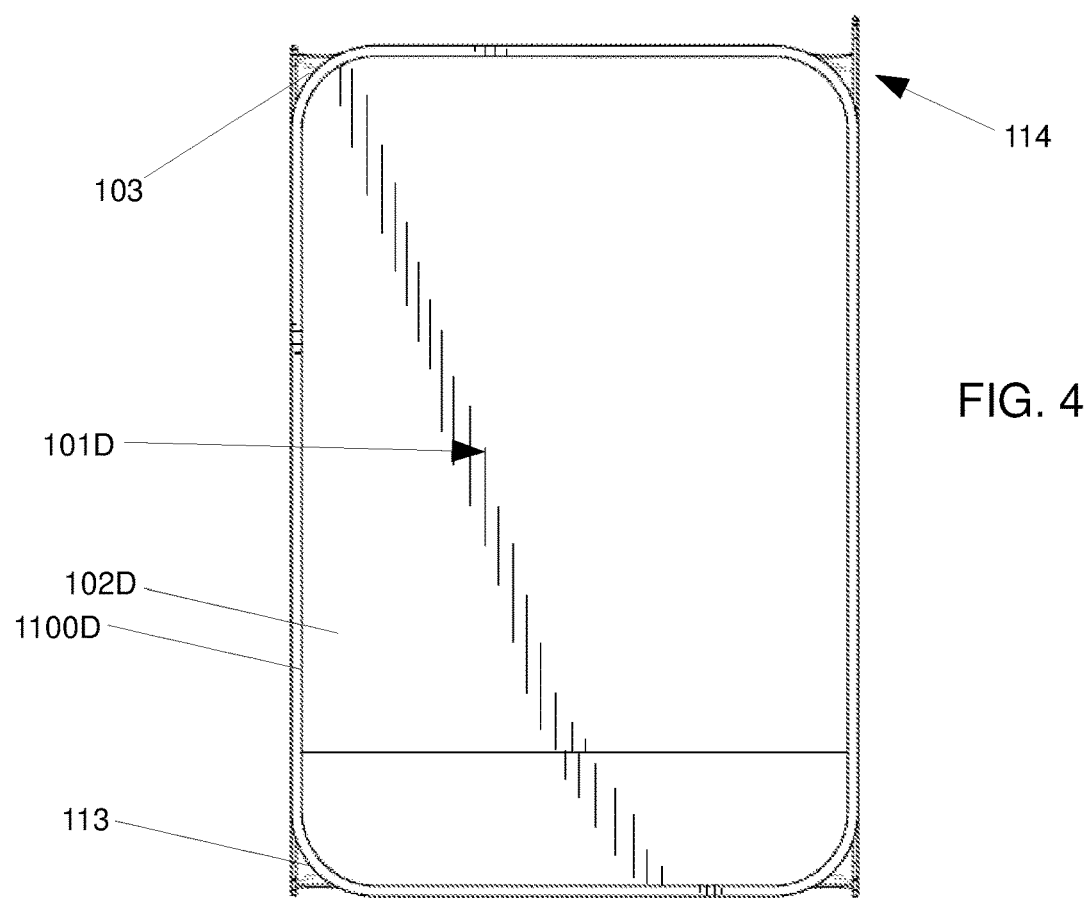
Figure 5:
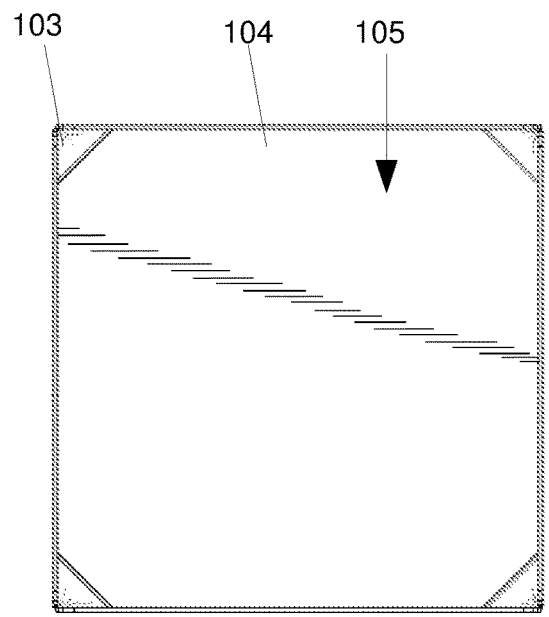
Figure 6:
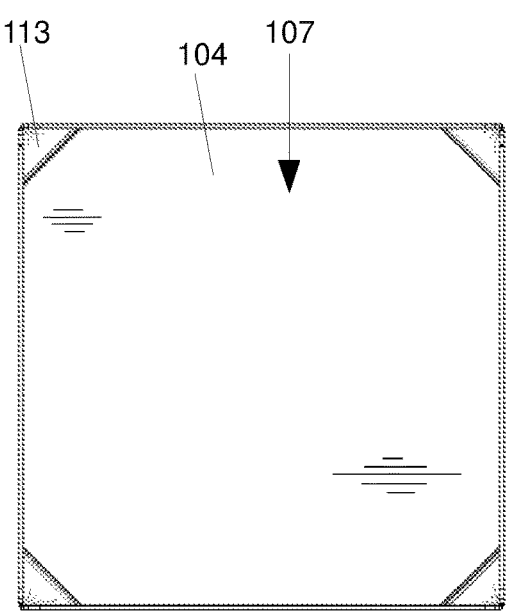

The present disclosure extends to apparatuses, methods, and systems for providing private temporary spaces or enclosures for online and distance meetings. It will be appreciated that the disclosure is applicable to any situation where a temporary space is needed, whether for use at home or any other location to provide privacy and prevent distractions for other online participants. For example, the present disclosure may be utilized in educational settings, business settings, personal settings, or any other setting where privacy and removing distractions from online participants in a meeting is advantageous. For the sake of simplicity, the disclosure will focus on educational settings, such as online courses or education, which is done by way of example only.

More specifically, the disclosure extends to portable and collapsible enclosures that may provide a learning or other space in a home environment for participating in online or distance education or other meetings, as well as methods and processes associated with their use and production. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing ice are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIGS. 1 through 6 depict a first illustrative embodiment of a collapsible structure 10 in accordance with the principles and technologies of the present disclosure.

It will be appreciated that as a collapsible structure, enclosure 10 may have some structural similarities to other known collapsible structures, including tents and modular "popup" play structures for children, such as those disclosed in U.S. Pat. No. 5,664,596 to Zheng, which issues Sep. 9, 1997, the contents of which are incorporated herein in their entirety, such as the use of flexible fabric material stretch across a frame. However, such known structures unsuitable for the processes and methods of the present disclosure due to the substantial differences between those known structures and the systems, apparatus, methods and processes of the present disclosure.

Enclosure 10 may be used for providing a private temporary space for online and distance education or other meeting, in a home or other setting by providing a protective barrier so the view of a participant in a shared online educational offering, such as a class or seminar that is available to multiple participants, or other meeting is limited to the participant and excludes the surrounding environment.

As depicted, enclosure 10, when erected, may generally be formed as a body, such as a rectangular body, with a front side 110, and right, rear, and left sides, respectively 101A, 101B and 101C, a top side 105 and a bottom 107. In one illustrative embodiment, the enclosure 10 may be formed as a generally rectangular body about 6 feet in height with a depth and width of about 4 feet.

The body may be defined by a framework. Where the enclosure 10 is a complete structure for ease in set up, take down, and storage, the framework may be formed by four separate frame members 2100A, 2100B, 2100C and 2100D, each formed as a "loop" of a flexible member material, such as a rod of fiberglass or another suitable polymer.

Each the three side panels 101A, 101B and 101C each include a textile member, such as a fabric material, 102A, 102B or 102C that is stretched across the side by the frame member. Similarly, front side 110 may include a stretched fabric material around an opening 112, as discussed further below. It will be appreciated that the side panels may be one continuous piece of material, or, may be formed from several pieces seamed together.

Each side panel may comprise a frame retaining sleeve 1100 for retaining one of the frame members 2100 (depicted in the partial sectional view of FIG. 2 as 1100B and 2100B). The frame retaining sleeves of adjacent side panels may be stitched together to form a hinged connection. Alternatively, the frame retaining sleeves of adjacent side panels may converge to form a singular retaining sleeve, which retains the adjacent sides of the adjacent frame members of the corresponding adjacent side panels. The stitching connecting the frame retaining sleeves may act as hinges for corresponding side panels.

As discussed above, the right side, left side, and rear side of the enclosure 10 may be completely covered by textile panels. Each of these sides may be sized to allow a participant to sit or stand inside the enclosure 10. In one illustrative example, each side may have a height of about 180 cm and a width of about 120 cm. It will be appreciated that these dimensions are only illustrative and that particular embodiments may vary without departing from the scope of the disclosure.

Further, the textile panels 102 of each side 101 may be colored to provide privacy from the surrounding area while providing a contrasting background such that the participant can be easily visualized by other participants viewing them though an online portal. For example, they may be formed from a white or cream-colored material. In other embodiments, they material may be blue or other color. A contrasting outline around the perimeter, such as a black outline may be present.

In some embodiments, the material may be formed of a color allowing a background to be virtually projected therein, such that other participants in an educational or other setting see the participant in the enclosure 10 against the projected background. Where this is done, a feature for alignment of projected or virtually projected images may be present. For example, the use of a contrasting perimeter may allow for the alignment of such images. In one illustrative embodiment, the textile panels 102 could be formed of a material having a suitable color for allowing projection by, or similar to, "greenscreen" use of projected backgrounds with a black band around the perimeter to facilitate image alignment.

Turning to front side 110 of the enclosure, a large opening 105 is present. In some embodiments, this may be accomplished by simply having an open side that lacks a textile panel. In others, as depicted, it may be formed by having a textile material around the perimeter of the front side, surrounding the opening. The opening 105 should be sized to allow a camera used for the online or distance education to visualize the interior of the enclosure 10 and a participant residing therein. For example, in an embodiment having sides that are generally about 108 cm in height and 120 cm in width, the textile material could have width of about 6 inches in an upper portion 114 across the top of the front panel 110, two opposite downwardly extending sides 116A and 116B, and a lower portion 118 across the bottom of the frame. The sides and lower portions could have a width of about 2 inches. As with the side and rear panels, the material could be colored and have a contrasting perimeter in certain embodiments. The edge 120 of opening 105 could be formed as a reinforced seam or additional reinforcing section of material.

As best depicted in FIGS. 3 and 4, the larger upper section 114 may extend further upward than the other sides of the enclosure 10. This can provide a place for indicia, such as a university or business name or a logo, to be printed on the larger upper section 114.

In one illustrative embodiment, the opening 105 may be sized to allow a participant to comfortable walk through the opening to enter and exit the enclosure 10. This may ensure the opening is of suitable size to allow for video taking of a participant during an educational session or other meeting.

Turning to top side 105, it may be closed by a textile material panel 104 connected to the top sides of the four side panels and extending therebetween. The top panel 104 may be formed from a lighter colored material, such as a white or light blue material that is translucent to allow diffuse light from the area where the enclosure is placed into the interior of the enclosure 10. As depicted, at the upper corners of the enclosure 10, generally triangular portions 103 of textile material may be present to join the upper panel 104 to the "hinge" portion between the side panels and facilitate set up and take down.

The bottom side 107 of the enclosure 10, may be formed as an open side as depicted at 106. In other embodiments, a strip of textile material could be placed around the perimeter of the bottom side 107 and may be colored with or without a contrasting outline. This could allow for a continuity of a virtually projected image. As depicted, at the lower corners of the enclosure 10, generally triangular portions 113 of textile material may be present to join the "hinge" portion between the side panels (and where present the strip of textile around the perimeter) to facilitate set up and take down.

Figure 7A:
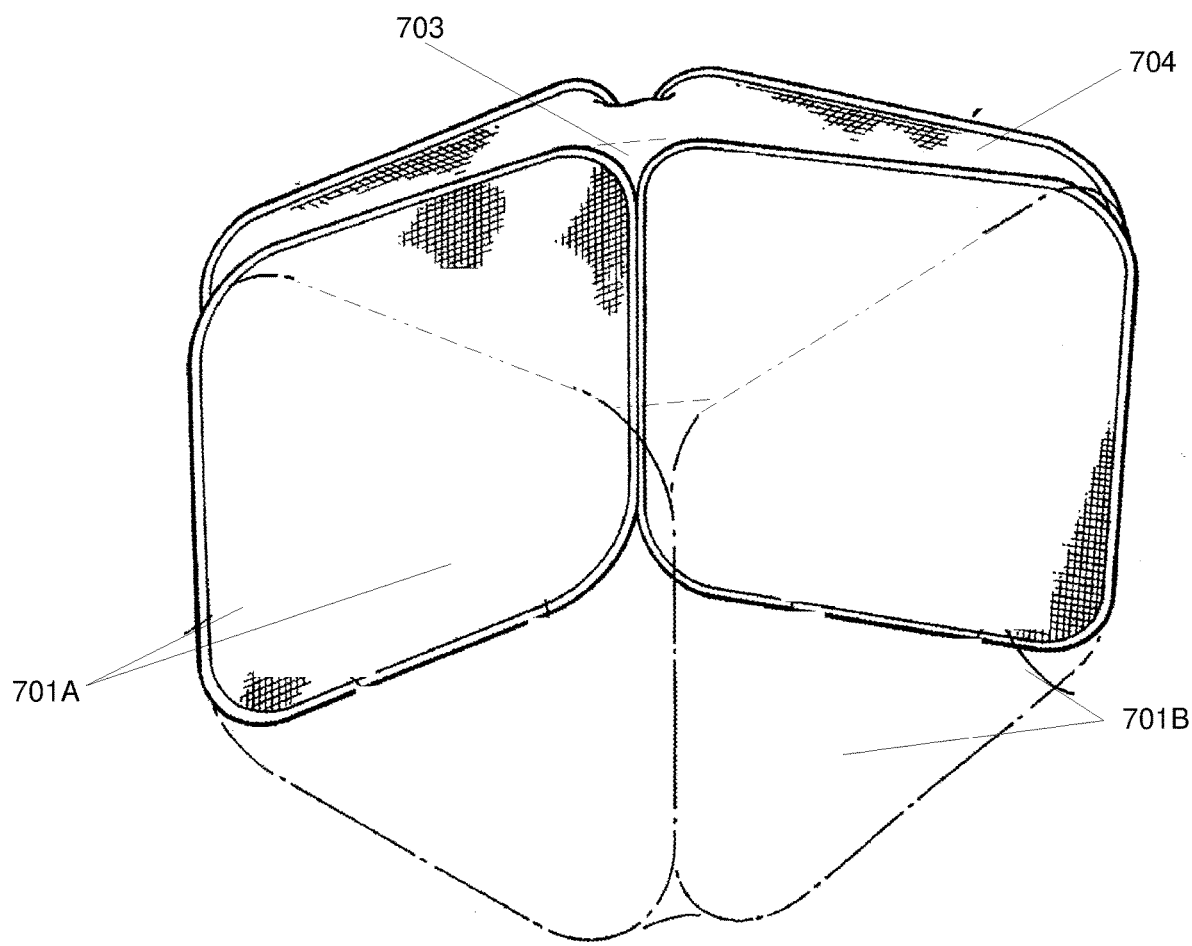
FIGS. 7A and 7B illustrate a perspective view of an enclosure in accordance with the technologies and features of the disclosure being collapsed for storage.
Figure 7B:
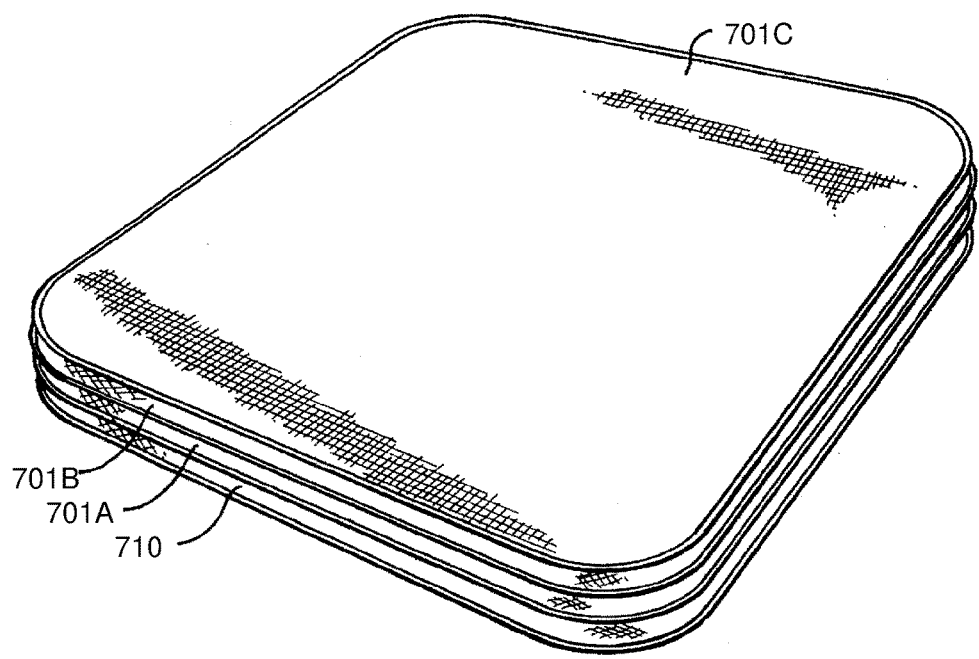

FIGS. 7A and 7B depict the takedown of another embodiment of an enclosure 70 in accordance with the present disclosure. As with enclosure 10, each side panel 710, 701A, 710B, and 701C comprises a frame retaining sleeve for retaining a frame member. The frame retaining sleeves of adjacent side panels are stitched together to form a hinged connection. When the enclosure 70 is to be folded and stored, the side panels and their corresponding frame members may be folded on top of each other about the hinges as depicted in FIG. 7A, resulting in the side panels and frame members overlaying each other as depicted in FIG. 7B. The enclosure 70 may then be stored flat until needed for further use, when it can be erected by reversing the process. In some embodiments using suitable frame members and textile material panels, the overlying side panels and frame members could then be further collapsed by twisting and folding to form a plurality of concentric frame members and side panels to substantially reduce the size of the collapsed enclosure 70.

It will be appreciated that the enclosure 10, or 70 may be sized to allow a participant, such as a student, teacher, or other person, to sit or stand therein and the interior viewed by other participants using a camera for online education. For example, in a virtual classroom, where students and instructors need to interact for items such as group work or real-time classroom discussions, each participant may have an enclosure 10 that they set up prior to participating in a class session. The participant may use a suitable computer and camera set up that it arranged to view the interior of the enclosure, but not the surrounding area to participate in the session. Thus, each participant may be able to view other participants, such as fellow students, instructors, etc., but not place in which they are physically located. This can provide for the removal of distractions from the virtual educational setting. It can also provide additional privacy to the participants by screening their home or other location from the other participants.

It will be appreciated that the systems and methods of the present invention not only provide privacy to the participants, but by concealing the locations and backgrounds of the participants can allow for the socioeconomic differences between participants in a class or meeting to be obscured, which can lead to a more comfortable learning or business environment and produce better interactions between participants and better educational and business outcomes.

Where the enclosure 10 or 70 is constructed to allow for the virtual projection of desired background images around a participant, it can be used to simulate a classroom or other suitable environment for the participating individuals. Additionally, it can allow for the instructor to add additional elements to the instruction. For example, where the instructor is teaching a subject that is enhanced by showing real time interaction with certain settings or objects, the online system associated with the educational session could virtually suitable images around the instructor on the enclosure 10 or 70. For example, in an art class, the system could virtually project the images of a museum or gallery around the instructor.

Some suitable methods and processes for education and using collapsible enclosures in accordance with the present invention may include providing the enclosures to participants in a meeting or educational session to participants prior to the session. The participants may then erect the enclosures and place needed materials or items into them prior to the session and align their cameras, which may be webcams or laptop computer internal cameras, with the openings and then connect to an online learning or business system. The online learning system may then provide the communication and host the educational session and provide suitable communication between the various participants. The system may then provide projected or virtually projected imagery around one or more participants.

It will be appreciated that in addition to use in educational processes and settings, the enclosures in accordance with this disclosure may be used for meetings in business or other settings.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A collapsible enclosure for providing a space for an online meeting environment, the enclosure comprising:
   a first side comprising a first framework defining a first surrounding border and a first textile panel that is stretched across the first side;
   a second side opposite the first side, the second side comprising a second framework defining a second surrounding border and a second textile panel that is stretched across the second side;
   a third side comprising a third framework defining a third surrounding border and a third textile panel that is stretched across the third side, the third side hingedly attached to the first side and the second side, wherein the third textile panel is constructed of an opaque material that allows a virtual projection to be displayed on an image thereof during a video feed of the enclosure interior and has a feature thereon that allows for digital alignment of a virtual projection to be displayed on an image thereof during the video feed of the enclosure interior;
   a fourth side opposite the third side, the fourth side comprising a fourth framework defining a fourth surrounding border and a large opening disposed inside the fourth framework, the fourth side hingedly attached to the first side and the second side; and
   a top side comprising a fifth textile panel joined to the tops of each of the first side, the second side, the third side; and the fourth side.

2. The collapsible enclosure of claim 1, wherein the fourth side further comprises a fourth textile panel attached to the fourth framework and defining the large opening.

3. The collapsible enclosure of claim 2, wherein the fourth textile panel comprises a larger upper portion that extends above the top and the first, second, and third sides of the enclosure.

4. The collapsible enclosure of claim 1, wherein the large opening is sized such that a participant may walk into the enclosure.

5. The collapsible enclosure of claim 1, wherein the first and second textile panels are constructed of an opaque material that allows a virtual projection to be displayed on an image thereof during a video feed of the enclosure interior.

6. The collapsible enclosure of claim 5, wherein the first and second textile panels each have at least one feature thereon that allows for digital alignment of a virtual projection to be displayed on an image thereof during a video feed of the enclosure interior.

7. The collapsible enclosure of claim 1, wherein the feature thereon that allows for digital alignment of a virtual projection to be displayed on an image thereof during a video feed of the enclosure interior comprises a band of a contrasting color around a perimeter of the textile panel.

8. The collapsible enclosure of claim 1, wherein the fifth textile panel is constructed from a textile material that allows light from the surrounding environment to diffuse therethrough.

9. A collapsible enclosure for providing a space for an online meeting environment, the enclosure comprising:
   a first side comprising a first framework defining a first surrounding border and a first textile panel that is stretched across the first side;
   a second side opposite the first side, the second side comprising a second framework defining a second surrounding border and a second textile panel that is stretched across the second side;
   a third side comprising a third framework defining a third surrounding border and a third textile panel that is stretched across the third side, the third textile panel constructed of an opaque material that allows a virtual projection to be displayed on an image thereof during a video feed of the enclosure interior and further including at least one feature thereon that allows for digital alignment of a virtual projection to be displayed on an image thereof during a video feed of the enclosure interior, the third side attached to the first side and the second side;
   a fourth side opposite the third side, the fourth side comprising a fourth framework defining a fourth surrounding border and a large opening disposed inside the fourth framework, the fourth side attached to the first side and the second side; and
   a top side comprising a fifth textile panel joined to the tops of each of the first side, the second side, the third side; and the fourth side.

10. The collapsible enclosure of claim 9, wherein the fourth side further comprises a fourth textile panel attached to the fourth framework and defining the large opening.

11. The collapsible enclosure of claim 9, wherein the large opening is sized such that a participant may walk into the enclosure.

12. The collapsible enclosure of claim 9, wherein the first and second textile panels are constructed of an opaque material that allows a virtual projection to be displayed on an image thereof during a video feed of the enclosure interior.

13. The collapsible enclosure of claim 12, wherein the first and second textile panels each have at least one feature thereon that allows for digital alignment of a virtual projection to be displayed on an image thereof during a video feed of the enclosure interior.

14. The collapsible enclosure of claim 13, wherein the feature thereon that allows for digital alignment of a virtual projection to be displayed on an image thereof during a video feed of the enclosure interior comprises a band of a contrasting color around a perimeter of the textile panel.

15. The collapsible enclosure of claim 9, wherein the feature thereon that allows for digital alignment of a virtual projection to be displayed on an image thereof during a video feed of the enclosure interior comprises a band of a contrasting color around a perimeter of the textile panel.

16. A method of providing privacy to a participant in an online meeting with multiple participants, the method comprising:
   providing a collapsible enclosure for providing a meeting space for an online meeting environment for at least one participant in an online meeting, where the enclosure comprises:
   at least one framework,
   a first side comprising a first textile panel,
   a second side opposite the first side, the second side comprising a second textile panel,
   a third side comprising a third textile panel, the third side attached to the first side and second side,
   a fourth side opposite the third side, the fourth side defining an opening sized such that the participant may walk through the opening into an interior of the enclosure, the fourth side attached to the first side and the second side, and a top side comprising a fifth textile panel joined to the tops of each of the first side, the second side, the third side; and the fourth side, wherein at least the first textile panel, second textile panel, and third textile panel comprise opaque flexible material, and wherein at least one textile panel is constructed of an opaque material that allows a virtual projection to be displayed on an image thereof during a video feed of the enclosure interior and has at least one feature thereon that allows for digital alignment of a virtual projection to be displayed on an image thereof during a video feed of the enclosure interior;

erecting the collapsible enclosure;

positioning a camera for providing a video stream to an online learning system such that the camera views the interior of the enclosure;

virtually projecting an image on the video feed from the enclosure that may be viewed by other participants in the online meeting;

using the at least one featured to align the virtual projection on the enclosure interior; and wherein the at least one participant resides in the enclosure during the online meeting.

\* \* \* \* \*